United States Patent
Na et al.

(10) Patent No.: US 7,668,571 B2
(45) Date of Patent: Feb. 23, 2010

(54) SPEAKER SYSTEM FOR MOBILE DEVICE

(75) Inventors: Sang Ju Na, Seoul (KR); Jung Tae Kim, Pochun-si (KR)

(73) Assignee: LG Electronics Inc., Seoul (KR)

( * ) Notice: Subject to any disclaimer, the term of this patent is extended or adjusted under 35 U.S.C. 154(b) by 525 days.

(21) Appl. No.: 11/564,381

(22) Filed: Nov. 29, 2006

(65) Prior Publication Data

US 2007/0223739 A1      Sep. 27, 2007

(30) Foreign Application Priority Data

Mar. 21, 2006   (KR) .................. 10-2006-0025598

(51) Int. Cl.
*H04R 1/00*   (2006.01)

(52) U.S. Cl. .................... 455/569.1; 381/334

(58) Field of Classification Search ............. 361/683; 381/334; 455/569.1
See application file for complete search history.

(56) References Cited

U.S. PATENT DOCUMENTS

| | | | | |
|---|---|---|---|---|
| 5,604,663 | A * | 2/1997 | Shin et al. ............ | 361/679.43 |
| 6,233,343 | B1 * | 5/2001 | Muranami et al. ........ | 381/96 |
| 6,798,654 | B2 * | 9/2004 | Chang et al. ........ | 361/679.23 |
| 6,813,528 | B1 * | 11/2004 | Yang ..................... | 700/94 |
| 7,433,182 | B2 * | 10/2008 | Fan .................... | 361/679.55 |
| 2004/0028476 | A1 * | 2/2004 | Payne et al. ............ | 405/184 |
| 2004/0196985 | A1 * | 10/2004 | Kokubo ................ | 381/79 |
| 2005/0192687 | A1 * | 9/2005 | Lee et al. ................ | 700/94 |
| 2007/0079027 | A1 * | 4/2007 | Marriott et al. ............ | 710/62 |

FOREIGN PATENT DOCUMENTS

| | | | |
|---|---|---|---|
| EP | 1881393 A1 * | 1/2008 | |
| KR | 2005061988 A * | 6/2005 | |
| KR | 2005118979 A * | 12/2005 | |
| WO | WO 0129910 A1 * | 4/2001 | |

OTHER PUBLICATIONS

KR 2005061988 A (English Translation), Jun. 2005, Park S C.*
KR 2005118979 A (English Translation) Dec. 2005, Lee J S.*

* cited by examiner

*Primary Examiner*—Vincent P Harper
*Assistant Examiner*—Marivelisse Santiago-Cordero
(74) *Attorney, Agent, or Firm*—Fish & Richardson P.C.

(57) ABSTRACT

A speaker system for a mobile device includes first and second audio processing units and first and second speakers for reproducing audio signals and outputting the reproduced audio signals. The speaker system also includes a controller configured for transferring the audio signal to the second speaker if a battery is connected to the mobile device. The first speaker is embedded in a main body of the mobile device and the second speaker is embedded in the battery of the mobile device.

19 Claims, 3 Drawing Sheets

SPEAKER SYSTEM FOR MOBILE DEVICE

BACKGROUND

This description relates to a speaker system for a mobile device.

A mobile device, such as a portable computer, can include an embedded speaker system for reproducing and outputting audio data, such as music. However, there are many hardware and software issues to consider when integrating an embedded speaker system with a mobile device, particularly a mobile device designed for portability and mobility.

A typical mobile device, such as a notebook computer, generally includes one or more speakers. If a single speaker is used, the sound quality produced by the notebook computer with the single speaker can be limited compared to a typical audio system having two or more speakers specifically provided for high, middle and low frequency registers (i.e., high, middle and low frequency bands).

A notebook computer can include a woofer speaker and a main speaker to provide high quality reproduction of an audio signal, e.g., for high, middle and low frequency registers. The woofer speaker is typically integrated in the main body of the notebook computer. However, the addition of a woofer speaker makes the notebook computer heavier and larger, and therefore may reduce the mobility and the portability of the notebook computer. Due to the space and weight considerations involved, a woofer speaker typically is not included in a mobile device, such as a notebook or sub-notebook computer that is designed to be lightweight and portable.

SUMMARY

In one general aspect, an audio system includes a speaker embedded in a battery of a mobile device.

In another general aspect, a speaker system for a mobile device includes first and second audio processing units and first and second speakers for reproducing audio signals and outputting the reproduced audio signals. The speaker system also includes a controller configured to transfer an audio signal to the second speaker if a battery is connected to the mobile device. The first speaker is embedded in a main body of the mobile device and the second speaker is embedded in the battery of the mobile device.

Implementations may include one or more of the following features. For example, the first audio processing unit and the first speaker may output a first register of the audio signal, and the second audio processing unit and the second speaker, which may be a woofer speaker, may output a second register of the audio signal. The first register may be a full frequency band, a mid-frequency band or a high frequency band, and the second register may be a low frequency band.

The battery having the second speaker may be a second battery provided as an external battery.

The speaker system may include a first battery embedded within the main body of the mobile device and a second battery within a battery module releasably connected to the main body, wherein the second speaker is embedded in the battery module.

The controller may be configured for selectively controlling the second audio processing unit to be operated in an active state or a standby state.

The first audio processing unit and the first speaker selectively may output a first register or a second register of the audio signal, and the second audio processing unit and the second speaker may output a third register in the input audio signal. To this end, the first audio processing unit and the first speaker may be configured for filtering entire frequency bands or a high frequency band of the audio signal, for amplifying the filtered audio signal, and for outputting the amplified audio signal. The second audio processing unit and the second speaker may be configured for filtering a low frequency band of the audio signal, amplifying the filtered audio signal and outputting the amplified audio signal.

The speaker system may include a residual quantity detecting sensor for sensing a remaining charge of the first or second battery, and the controller may control the second audio processing unit and the second speaker according to the sensed remaining charge of the first or second battery.

The speaker system also may include a battery sensor configured for detecting if the battery is operatively connected to the mobile device, and the controller may control the second audio processing unit according to an output from the battery sensor.

The speaker system may include an AC power detecting sensor configured for detecting if an AC power source is operatively connected to the mobile device, and the controller may control the second audio processing unit according to an output from the AC power detecting sensor.

The controller may be configured to drive the first audio processing unit in a first register filtering mode if the second audio processing unit and the second speaker are not operatively processing the audio signal, and in a second register filtering mode when the second audio processing unit and the second speaker are operatively processing the audio signal.

The controller also may be configured to selectively interrupt the first audio signal processing unit and the second audio signal processing unit in a speaker bypass mode. The speaker bypass mode may occur when a headset is operatively connected to the mobile device.

In another general aspect, a speaker system for a mobile device includes first and second audio processing units and first and second speakers for reproducing audio signals and outputting the reproduced audio signals. The speaker system also includes a controller configured to selectively transfer an audio signal to the first speaker and the second speaker. The first speaker is embedded in a main body of the mobile device, and the second speaker is embedded in a battery module of the mobile device or is embedded in a docking station operatively connected with the mobile device.

In another general aspect, controlling a speaker system for a mobile device includes determining if a battery module having an embedded speaker is operatively connected with the mobile device, and controlling an operation mode of an audio signal processing unit based on whether the battery module is operatively connected with the mobile device. In one operation mode, an audio signal is transmitted from the mobile device to the embedded speaker in the battery module.

Implementations may include one or more of the following features. For example, the battery module may be integrally fitted within a main body of the mobile device or within a docking station operatively connected with the mobile device.

The audio signal is produced through another speaker embedded within a main body of the mobile device, with the other speaker filtering a different register of the audio signal compared to a register of the embedded speaker within the battery module.

The audio signal processing unit is bypassed if the battery module is not operatively connected with the mobile device.

A remaining charge of the battery module is detected when the second battery is mounted, and the audio signal processing unit is controlled based on the detected remaining charge of the battery module. The audio signal processing unit is controlled without considering the remaining charge of the battery module if an AC power supply is operatively connected with the mobile device.

The audio signal processing unit also may be selectively controlled in response to a user-defined input.

Other features will be apparent from the following description, including the drawings, and the claims.

DETAILED DESCRIPTION

In general, the same reference numbers will be used throughout the drawings to refer to the same or like parts. Since a typical woofer speaker can have a high power demand, the operating time of a mobile device, such as a notebook computer, sub-notebook or laptop computer, can be reduced by the combined operation of a main speaker and the woofer speaker which collectively consume more power from a battery. Alternatively, if only a main speaker having relatively low power demand is installed in the computer, the sound quality of the speaker system may be limited.

Figure 1:
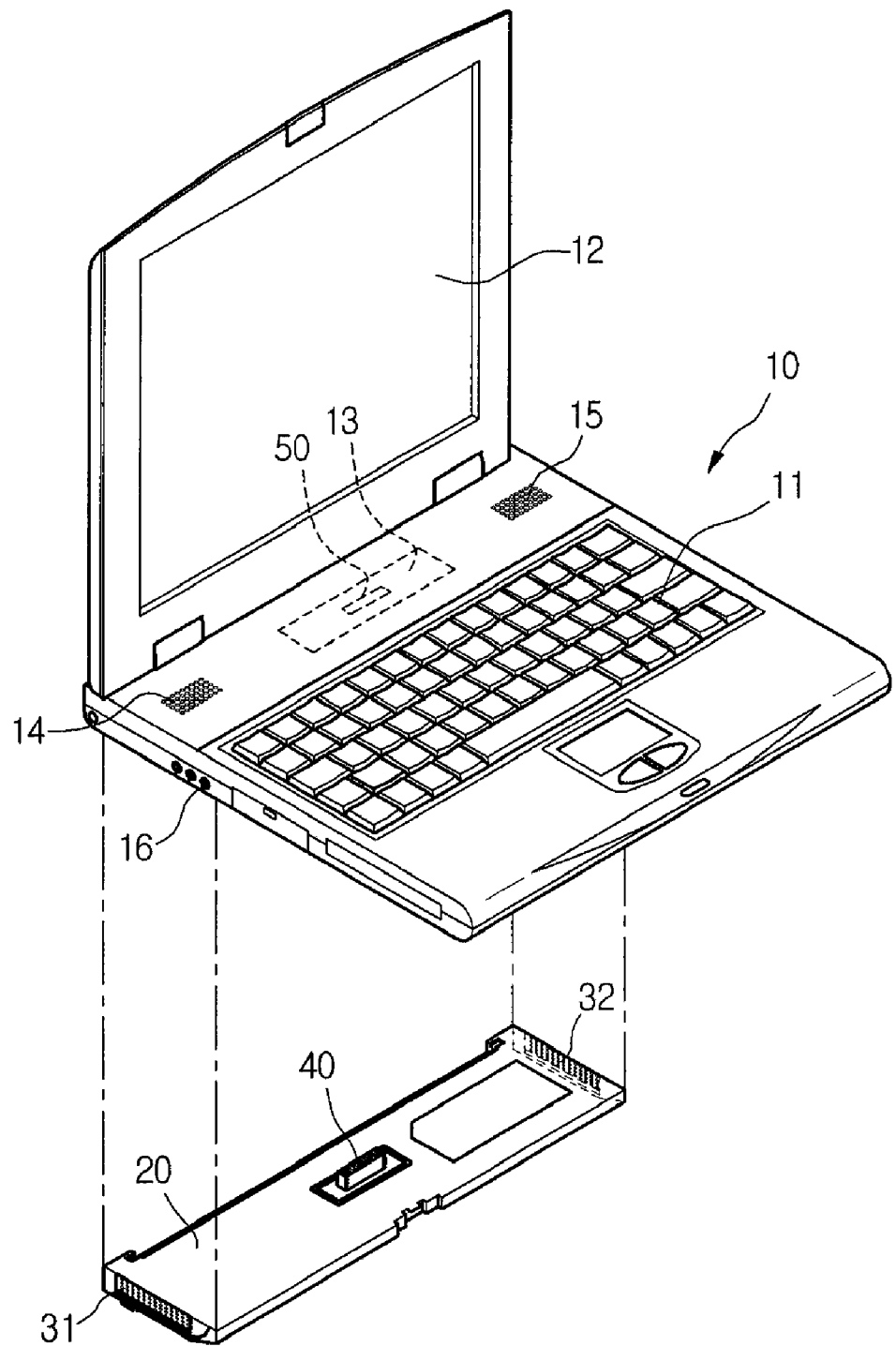
FIG. 1 is a perspective view of a notebook computer having a speaker system.

Referring to FIG. 1, an exemplary notebook computer includes a main body 10, a keyboard 11, and a display 12. The main body 10 of the notebook computer includes a first battery 13 and a pair of main speakers 14 and 15. A headphone port 16 is disposed at a side of the main body 10 of the notebook computer along with other I/O ports.

A battery module 20 includes a secondary battery that is provided separately from the first battery which is embedded in the main body 10 of the notebook computer. The battery module 20 includes woofer speakers 31 and 32 which are disposed at both sides of the battery module 20. However, the number of woofer speakers and/or the locations of the woofer speakers is not limited to the aforementioned example. For example, two or more woofer speakers may be disposed along edges of the battery module 20 at a bottom surface thereof or may be disposed in a central portion of the bottom surface of the battery module 20, or only a single woofer speaker may be included.

The battery module 20 is integrally fitted with the main body 10 of the notebook computer The main body 10 and the battery module 20 include connectors 40 and 50, respectively, to supply power from the battery module 20 to the main body 10. The connectors 40 and 50 are used not only to supply the electric power to the main body 10 of the notebook computer, but also include an audio output connection to supply an audio signal to the woofer speakers 31 and 32 of the battery module 20. The connectors 40 and 50 may include, for example, a pin and slot type connection. Although not shown specifically in FIGS. 1-3, the audio output connection that transmits audio signals from the main body 10 extends from the connectors 40 and 50 and to the woofer speakers 31 and 32.

Figure 2:
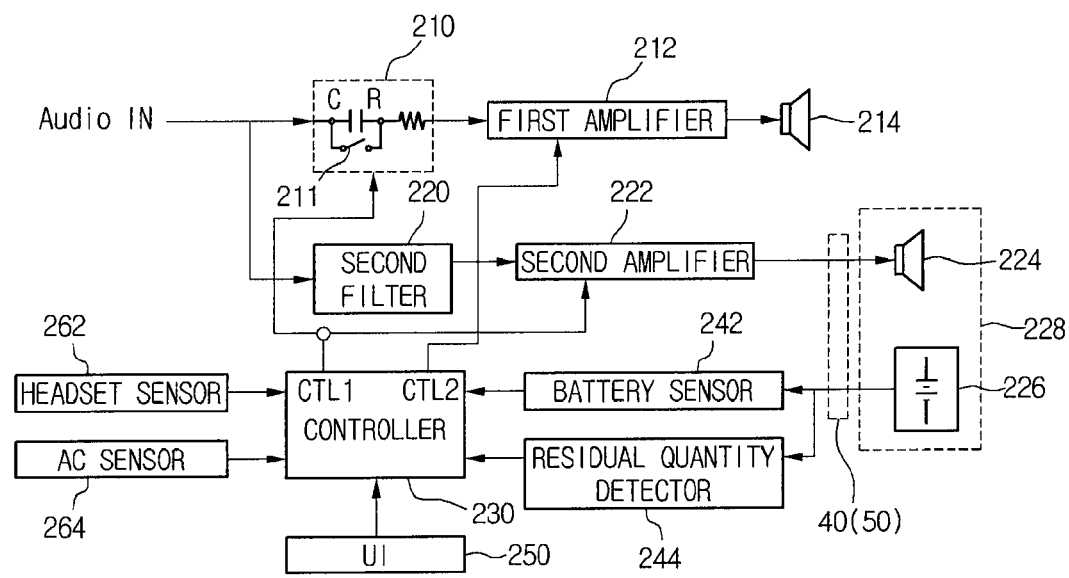
FIG. 2 is a block diagram of a speaker control unit.

Referring to FIG. 2, an exemplary speaker controller system includes a first filter 210 for performing a first register pass filtering on an input audio signal (Audio IN), a first amplifier 212 for amplifying the first register audio signal outputted from the first filter 210, and a first speaker 214 for outputting the amplified first register audio signal from the first amplifier 212. The speaker controller system also includes a second filter 220 for performing a second register pass filtering on the input audio signal (Audio IN), a second amplifier 222 for amplifying the second register audio signal filtered from the second filter 220, a second speaker 224 for outputting the amplified second register audio signal from the second amplifier 222, a second battery 226 for supplying a power to a notebook computer, and a second battery module 228 including the second speaker 224 and the second battery 226.

The speaker controller system also includes a controller 230 for controlling the filters 210, 220 and the amplifiers 212, 222 according to a number of operational conditions, such as whether the second battery is mounted, according to a residual charge quantity of the second battery, according to whether the AC power is supplied, and/or according to whether the headset is connected. The speaker controller system includes a battery sensor 242 for sensing whether the second battery 226 is mounted and for generating a battery-sensing signal. A residual quantity detector 244, such as a voltage sensor, is provided in the speaker controller system for detecting the residual charge quantity (referred to below as "the residual quantity") of the second battery 226, such as remaining voltage, for generating a detecting signal, such as percentage of operating time or battery charge remaining, and for outputting the detecting signal to the controller 230.

In addition, the speaker controller system can generate a user interface 250 on a display of the notebook computer (FIG. 1) which permits a user to control the speaker system and settings. A headset sensor 262 is provided for sensing whether the headset is connected and for providing a headset sensing signal to the controller 230 to indicate the presence of a connected headset. An ACV sensor 264 is provided for sensing whether AC power is being supplied to the notebook computer and for providing the AC sensing signal to the controller 230.

In the exemplary speaker controller system of FIG. 2, the battery module 228 is connected to the main body 10 of the notebook computer through the electrical connectors 40 and 50, which include the connection that supplies battery power and/or audio output. The second battery 226 is a supplementary battery provided separately from the first battery embedded in the main body 10 of the notebook computer. The first register filter is configured for a high frequency band audio signal or a full-band audio signal, and the second register is a low frequency band audio signal. However, a speaker controller system can include multiple filters with a configuration having duplicative and/or complementary filtering arrangements.

Referring to FIG. 2, the first filter 210 is operated as a high frequency band pass filter or a full-band pass filter in response to the controller 230. Accordingly, the first filter 210 includes a filter circuit having a capacitor C and a resistor R, and a switch 211 turned on and off in response to the controller 230 to selectively short out the capacitor C. The second filter 220 is a low frequency band pass filter. The first speaker 214 is a main speaker embedded in the main body of the notebook computer and the second speaker 224 is a woofer speaker embedded within the battery module 20.

The battery sensor 242 senses whether the battery module 228 is mounted in the main body 10 of the notebook computer. The battery sensor 242 determines whether the electric power is supplied through the wiring of the connectors 40 and 50, and uses the result of the determination to sense the mounting of the battery module 228. Alternatively, or in addition to, the battery sensor 242 may include a mechanical switch within the main body 10 to sense whether the battery module 228 is mounted. Since the use of a mechanical switch requires additional parts, such as the switch, the use of the wiring of the connectors 40 and 50 is beneficial in that a completed circuit will be sufficient to indicate a properly installed battery module 20.

The residual quantity detector 244 can include one or more of a number of known voltage detecting sensors. In one particular implementation, the residual quantity detector 244 of FIG. 2 includes a voltage sensing circuit which detects a residual quantity of a battery, and uses the detected quantity to estimate remaining operating time or battery life. The headset sensor 262 includes a circuit which detects the connection of a headset to the main body 10 of the notebook computer. The ACV sensor 264 includes a circuit that senses whether AC power is supplied, e.g., through a wired connection and AC adapter to a backup or stationary AC power source. Accordingly, a variety of well-known AC sensing circuit may be used as the ACV sensor 264. The notebook computer system can generally be provided with one or more well-known sensing circuits, such as a sensing circuit for the second battery, a residual quantity detecting circuit, a headset sensing circuit and/or an ACV sensing circuit.

Referring to FIG. 2, the first amplifier 212 is a part of a main amplifying circuit and the second amplifier 222 is a woofer amplifier. The controller 230 controls the first and the second amplifier 212 and 222. For example, the controller 230 turns on and off the amplifiers 212 and 222 by generating the control signals CTL1 and CTL2 for supplying or interrupting the power to the amplifiers 212 and 222. The user interface 250, in addition to a graphical user interface displayed on the notebook computer, may include one or more of a keyboard, a mouse, a touch screen, and a pen input device that may be used alternatively, or in addition to, the graphical user interface.

Operation of the speaker control system includes an operation [1] in which a second battery 226 and a battery module 228 are not mounted to the main body 10. The system operates in this mode when the battery sensor 242 determines that the second battery 226 is not mounted, and the battery sensor 242 outputs a no-battery sensing signal to the controller 230. In this case, the controller 230 outputs a first control signal CTL1 to drive the first filter 210 as a full-band filter. The switch 211 of the first filter 210 is turned on in response to the first control signal CTL1 to short the capacitor C, and the first filter 210 is operated as the full-band filter.

The controller 230 also interrupts the second amplifier 222 by generating the first control signal CTL1. Furthermore, the controller 230 outputs a second control signal CTL2 to turn on the first amplifier 212. Therefore, the input audio signal (Audio IN) is filtered by the first filter 210, and the filtered audio signal is outputted through the first speaker 214, e.g., the main speaker embedded in the main body 10 of the notebook computer. The full-band filter may be in a range from, for example, about 20 Hz to 20 kHz.

Operation of the speaker control system includes an operation [2] in which a second battery 226 and a battery module 228 are mounted to the computer. The system operates in this mode when the battery sensor 242 determines that the second battery 226 is mounted, and the battery sensor 242 outputs a battery-sensing signal to the controller 230. In this operation mode, the controller 230 outputs the first control signal CTL1 to drive the first filter 210 as the high frequency band filter. That is, the first control signal CTL1 turns off the switch 211 of the first filter 210 to open a bypass path of the capacitor C. Accordingly, the first filter 210 is operated as a high frequency band pass filter.

The first control signal CTL1 output from the controller 230 turns on the second amplifier 222, and the controller 230 outputs a second control signal CTL2 to drive the first amplifier 212.

The input audio signal (Audio IN) is high-band filtered by the first filter 210 and the filtered audio signal is output through the first speaker 214, e.g., a main speaker mounted at the main body of the notebook computer. The high frequency band is designated in a range from, for example, about 800 Hz to 20 kHz.

The input audio signal (Audio IN) is also low band filtered by the second filter 220 and the filtered audio signal is amplified by the second amplifier 222. The amplified audio signal is output through the second speaker 224, e.g., a woofer speaker embedded in the battery module 228. The low frequency band for the woofer speaker is designated in a range from, for example, about 20 Hz to 800 Hz. Accordingly, if the battery module 228 is mounted in the notebook computer, the high frequency band audio signal is output through the first speaker 214 and the low frequency band audio signal is output through the second speaker 224.

Operation of the speaker control system also includes an operation [3] in which the speaker system is controlled according to the residual quantity of the second battery 226. The speaker controlling system detects the residual quantity of the battery when the second battery 226 and the battery module 228 are mounted to the main body 10 of the notebook computer. The speaker controlling system automatically controls the woofer speaker to be driven or interrupted according to the detected residual quantity of the battery.

For example, the residual sensor 244 detects the residual quantity, e.g., such as voltage of the battery, of the second battery 226. The residual sensor 244 transmits the information about the residual quantity of the second battery 226 to the controller 230. The controller 230 compares the residual quantity with a predetermined threshold value. The threshold value may be given as a default value or a value that is previously set by a user through the user interface unit 250. The residual quantity of the battery is closely related to an available time for using the notebook computer. Therefore, the residual quantity is used to decide whether the woofer speaker is used continuously or intermittently.

However, the operation of the woofer speaker may be designated by the user through the user interface 250. For example, the woofer speaker may be used until the available charge of the second battery 226 is completely or nearly consumed, e.g., exceeds a minimum threshold value typically permitted in an automatic mode. Since the user is permitted to dynamically control the speaker operation, the user can also designate a threshold value. For example, the user can increase or decrease the threshold value and store the set threshold value by inputting a predetermined key through the user interface 250. Also, a menu for setting a level of a residual quantity that automatically interrupts the woofer speaker may be provided and may include options for setting the residual quantity of the battery to control the woofer speaker in proportion to the residual quantity of the battery.

If the residual quantity sensor 244 determines that the residual quantity of the second battery 226 is reduced below the threshold value, the controller 230 can interrupt the operation of the woofer speaker and revert to operation using just the main speaker(s). In order to interrupt the woofer speaker, the controller 230 outputs the first control signal CTL1 to interrupt the second amplifier 222. The second amplifier and the woofer speaker are then interrupted by interrupting the power to the second amplifier 222.

If the second speaker 224 is interrupted as described above, the controller 230 drives the first filter 210 to operate as a full band filter since the low frequency band register is not reproduced. The controller 230 outputs the first control signal CTL1 to turn on the switch 211 of the first filter 210, and both ends of the capacitor C are shorted. Accordingly, the first filter 210 is operated as the full-band filter to reproduce the low frequency band audio signal and the high frequency band audio signal. The reproduced audio signal is output through the first speaker 214 embedded at the main body of the notebook computer.

Even if the residual quantity of the second battery is relatively low, a user may want to use both the main speaker and the woofer speaker. In this case, the user interface 250 or display on the computer may display a warning message to ask a user if the woofer speaker should be used continuously or shut-off because the residual quantity of the battery is relatively low, e.g., below a preset threshold value set by the user or a default system setting. The system controller can then interrupt the operation of the woofer speaker, or continuously drive the woofer speaker, based on the user preferences and without regard to the residual quantity of the battery.

Operation of the speaker control system also includes an operation [4] in which the speaker system is controlled depending on the availability of AC power. The notebook computer system may directly receive AC power from a power supply, e.g., through a wired connection to a wall jack through an AC adapter, and not from the battery. The battery is typically recharged when the notebook computer system receives AC power directly from the power supply. Since power is not being obtained from the recharging battery, the woofer speaker is used continuously.

If the battery module 228 is mounted in the computer, and the AC sensor 264 senses that AC power is being directly received from an external power supply, the controller 230 drives the first filter 210 as the high band filter using the control signals CTL1 and CTL2, and turns on both of the first and the second amplifiers 212 and 222. Accordingly, the high frequency band audio signal is outputted through the first speaker 214 and the low frequency band audio signal is outputted through the second speaker 224. If the AC power is interrupted when the battery module 228 is mounted, the above-described operations for mounting the battery module are performed, e.g., depending upon residual charge of the battery and/or user designated threshold values.

Operation of the speaker control system also includes an operation [5] in which the control of the speaker system is dependent upon whether a headset is connected and/or the speaker system has been muted, e.g., by the user. If the headset sensor 262 determines that the headset is connected, or the audio of the speaker system is muted, the controller interrupts all of the speakers. The controller 230 turns off the first amplifier 212 and the second amplifier 222 through the control signals CTL1 and CTL2 in order to prevent power from being wasted to process the audio signal.

Figure 3:
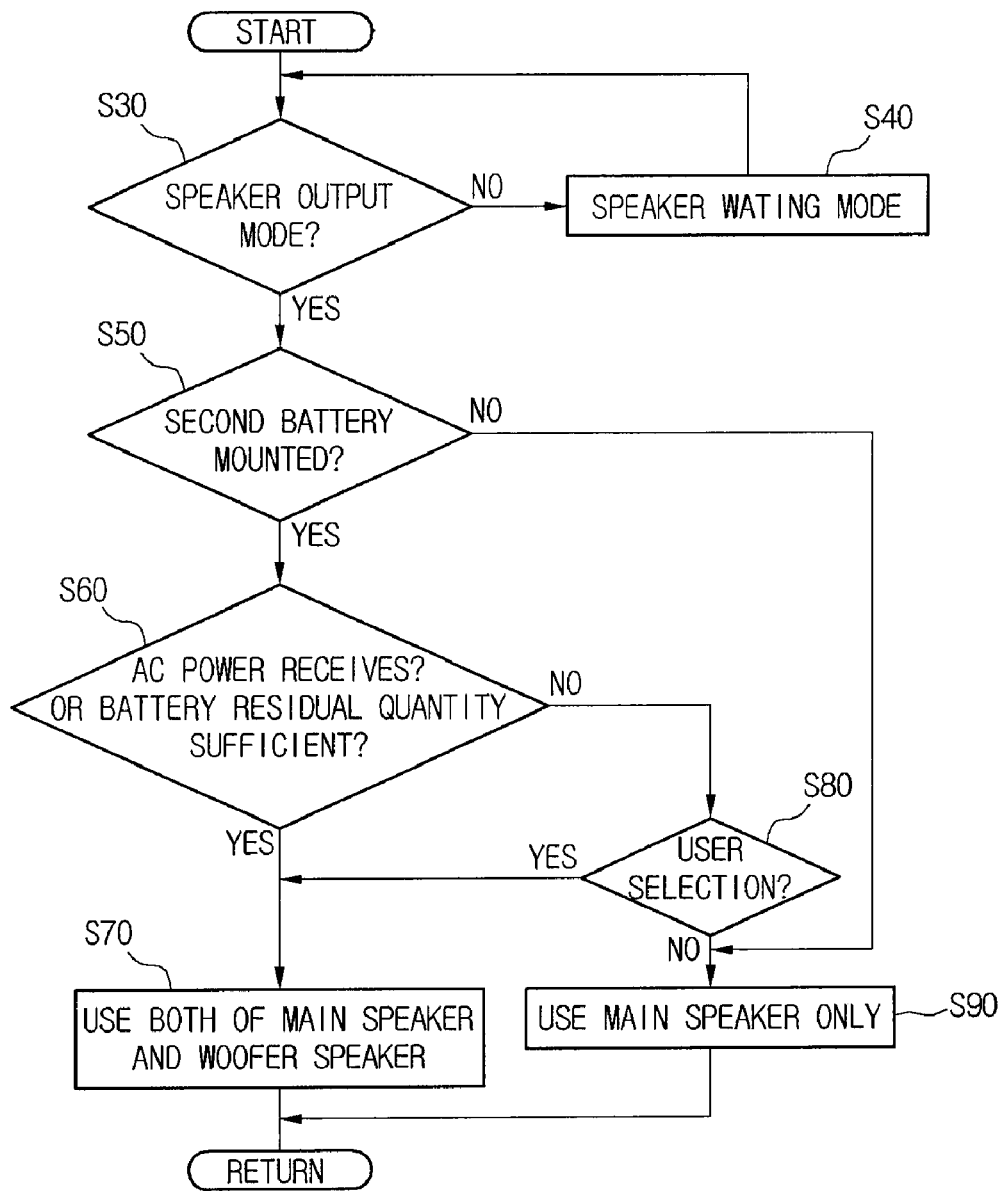
FIG. 3 is a flowchart of a method for controlling a speaker system.

Referring to FIG. 3, the controller 230 determines whether a current mode is a speaker output mode or not in operation S30. If the current mode is not the speaker output mode, the controller 230 controls the speaker to be in a standby mode in operation S40. If the current mode is the speaker output mode, the controller 230 determines if the second battery 226 and the battery module 228 are mounted by receiving a sensing signal from the battery sensor 242. If the battery module 228 is not mounted, the controller 230 performs operations to output audio signals only through the main speaker 214 in operation S90.

If the battery module 228 is mounted, the controller 230 determines if the AC power is directly supplied from an external power source, such as a wall jack or external battery, and, when power is supplied by a battery, determines if the residual quantity of the battery is sufficient to sustain the use of multiple speakers in operation S60. If AC power is directly supplied or the residual quantity of the battery is sufficient, the audio signal is outputted through both of the main speaker 214 and the woofer speaker 224 in operation S70.

If AC power is not directly supplied or the residual quantity of the battery is insufficient, the audio signal is outputted through the main speaker 214 only. However, if a user wants to use the woofer speaker despite a relatively low residual quantity of the battery, a user selecting operation S80 is performed and the controller determines whether a user wants the woofer speaker to be used continuously or not. If the user wants to continuously use the woofer speaker 214, the controller outputs the audio signal through both of the main speaker 214 and the woofer speaker 224. If not, the controller interrupts the woofer speaker 224 and uses only the main speaker 214 to output the audio signal.

Although the speaker is mounted in the secondary battery of the notebook computer, the woofer speaker may be mounted within a docking station of a notebook computer. The aforementioned speaker controller system could be used to control operation of the single speaker (undocked) or multi-speaker (docked) operation of the notebook computer. In addition, the speaker controller system can include one or more of a headset sensor, AC power sensor, residual quantity sensor, user interface and/or a battery sensor for detecting the presence of a battery which is connected to the computer.

It will be apparent that various modifications and variations can be made. For example, the speaker system for the mobile device can be controlled automatically or manually to turn the woofer speaker embedded within a secondary battery on or off to effectively use the battery. Accordingly, the aforementioned implementations provide a high quality sound through an embedded speaker within the secondary battery to output a variety of registers that may differ from a main speaker register embedded in the mobile device. Furthermore, the speaker system controls the woofer speaker according to the residual quantity of the battery, according to whether an external AC power source is detected, whether a headset is detected, and/or in response to automatic or manual settings to effectively use available battery power.

What is claimed is:

1. A speaker system for a mobile device comprising:
a first audio processing unit and a first speaker for reproducing an audio signal and outputting the reproduced audio signal, wherein the first speaker is embedded in a main body of the mobile device;
a second audio processing unit and a second speaker for reproducing the audio signal and outputting another reproduced audio signal;
a first battery embedded within the main body and a second battery within a battery module releasably connected to the main body, wherein the second speaker is embedded in the battery module;
a controller positioned in the mobile device and configured to perform operations comprising:
    determining if the battery module is connected to the mobile device;
    in response to a determination that the battery module is not connected to the mobile device, controlling the first audio processing unit to transfer the audio signal to the first speaker and controlling the second audio processing unit not to transfer the audio signal to the second speaker; and in response to a determination that the battery module is connected to the mobile device, controlling the first audio processing unit to transfer the audio signal to the first speaker and controlling the second audio processing unit to transfer the audio signal to the second speaker.

2. The speaker system of claim 1, wherein the first audio processing unit and the first speaker output a first register of the audio signal.

3. The speaker system of claim 2, wherein the first register is a full frequency band, a mid-frequency band or a high frequency band.

4. The speaker system of claim 2, wherein the second audio processing unit and the second speaker output a second register of the audio signal.

5. The speaker system of claim 4, wherein the second register is a low frequency band.

6. The speaker system of claim 1, wherein the second speaker is a woofer speaker.

7. The speaker system of claim 1, further comprising a residual quantity detecting sensor for sensing a remaining charge of the battery, wherein the controller controls the second audio processing unit according to the sensed remaining charge of the battery.

8. The speaker system of claim 1, further comprising a battery sensor configured for detecting if the battery is operatively connected to the mobile device, wherein the controller controls the second audio processing unit according to an output from the battery sensor.

9. The speaker system of claim 1, further comprising an AC power detecting sensor configured for detecting if an AC power source is operatively connected to the mobile device, wherein the controller controls the second audio processing unit according to an output from the AC power detecting sensor.

10. The speaker system of claim 1, wherein the controller is configured for driving the first audio processing unit in a first register filtering mode if the second audio processing unit and the second speaker are not operatively processing the audio signal.

11. The speaker system of claim 10, wherein the controller is configured for driving the first audio processing unit in a second register filtering mode when the second audio processing unit and the second speaker are operatively operated.

12. The speaker system of claim 1, wherein the controller is configured for selectively interrupting the first audio signal processing unit and the second audio signal processing unit in a speaker bypass mode.

13. The speaker system of claim 12, wherein the speaker bypass mode comprises a headset operatively connected to the mobile device.

14. A method of controlling a speaker system for a mobile device, comprising:

determining if a battery module having an embedded speaker is operatively connected with the mobile device, the mobile device having a first speaker and a first battery embedded within a main body of the mobile device, the battery module being releasably connected to the main body; the battery module having a second battery; and controlling, by a controller positioned in the mobile device, an operation mode of first and second audio signal processing units based on the determination of whether the battery module is operatively connected with the mobile device, the controlling comprising:

in response to a determination that the battery module is not connected to the mobile device, controlling the first audio processing unit to transfer the audio signal to the first speaker and controlling the second audio processing unit not to transfer the audio signal to the embedded speaker; and in response to a determination that the battery module is connected to the mobile device, controlling the first audio processing unit to transfer the audio signal to the first speaker and controlling the second audio processing unit to transfer the audio signal to the embedded speaker; and transmitting the audio signal from the mobile device to the embedded speaker in the battery module.

15. The method of claim 14, wherein the battery module is integrally fitted within a main body of the mobile device.

16. The method of claim 14, further comprising outputting the audio signal through another speaker embedded within a main body of the mobile device, wherein the other speaker embedded within the main body of the mobile device filters a different register of the audio signal compared to a register of the embedded speaker within the battery module.

17. The method of claim 14, further comprising bypassing the second audio signal processing unit if the controller determines a bypass mode.

18. The method of claim 14, further comprising:

detecting a remaining charge of the battery module when the battery is mounted, and controlling the second audio signal processing unit based on the detected remaining charge of the battery module.

19. The method of claim 14, selectively controlling the second audio signal processing unit responsive to a user-defined input.

* * * * *